Figure 1:
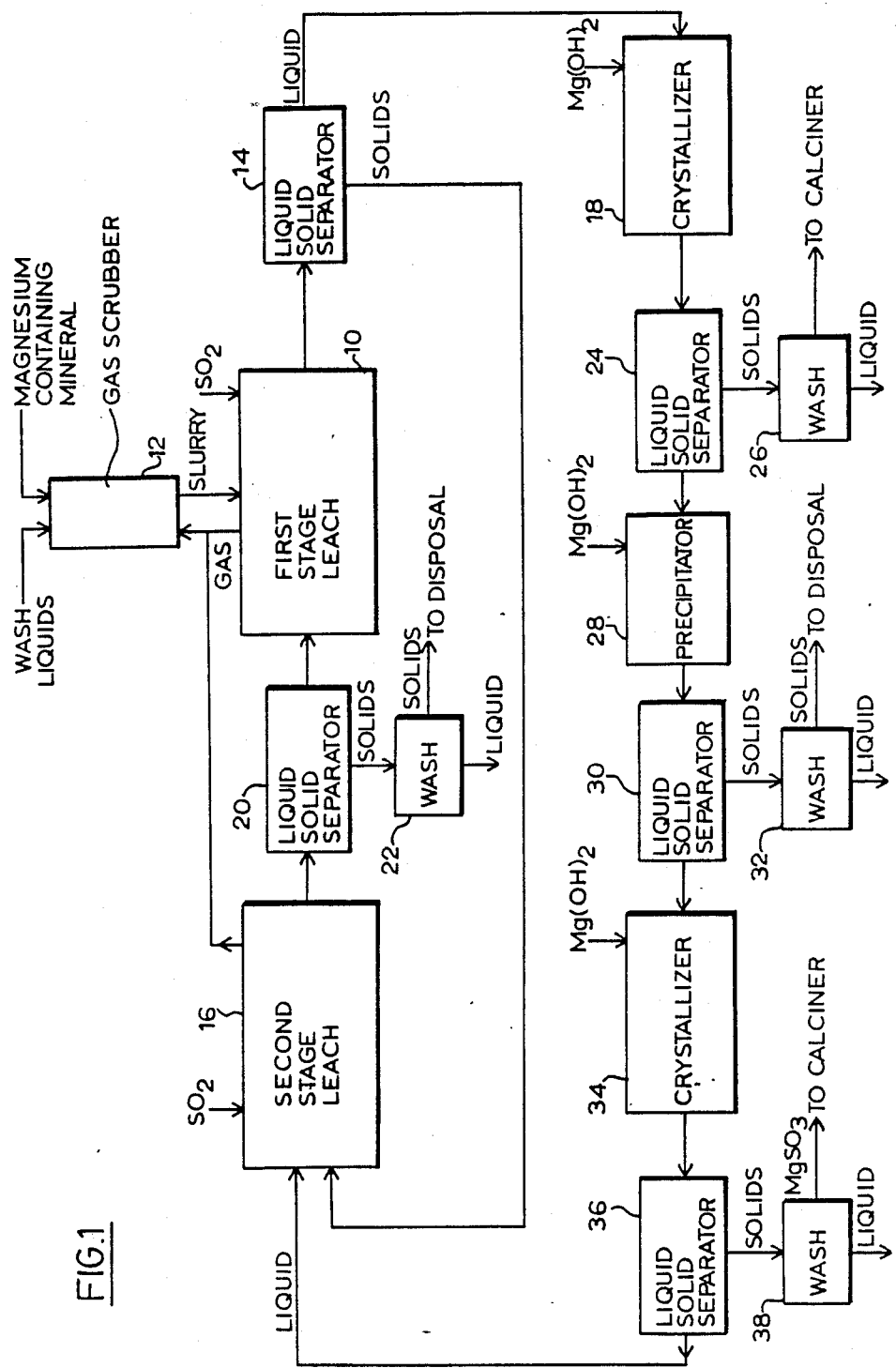

United States Patent [19]

Kirk et al.

[11] Patent Number: 4,937,056
[45] Date of Patent: Jun. 26, 1990

[54] PROCESS FOR OBTAINING HIGH PURITY MAGNESIUM COMPOUNDS FROM MAGNESIUM CONTAINING MATERIALS

[75] Inventors: Donald W. Kirk, Bolton; Murray C. Robinson, Don Mills, both of Canada

[73] Assignee: Materials-Concepts-Research Limited, Don Mills, Canada

[21] Appl. No.: 338,421

[22] Filed: Apr. 14, 1989

Related U.S. Application Data

[63] Continuation of Ser. No. 67,516, Jun. 18, 1987, abandoned.

[30] Foreign Application Priority Data

Jun. 20, 1986 [CA] Canada .................................... 512056

[51] Int. Cl.$^5$ ................................................ C01F 5/42
[52] U.S. Cl. ..................................... 423/155; 423/173; 423/512 A; 423/519
[58] Field of Search .................... 423/155, 173, 512 A, 423/519

[56] References Cited

U.S. PATENT DOCUMENTS

| | | | |
|---|---|---|---|
| 3,085,858 | 4/1963 | Trubey et al. | 423/164 |
| 3,679,362 | 7/1972 | Hartmann et al. | 423/169 |
| 3,812,235 | 5/1974 | Robinson | 423/148 |
| 4,118,458 | 10/1978 | Robinson | 423/109 |
| 4,154,802 | 5/1979 | Brandt et al. | 423/173 |
| 4,474,737 | 10/1984 | Najmr et al. | 423/155 |

Primary Examiner—John Doll
Assistant Examiner—Wayne A. Langel
Attorney, Agent, or Firm—Rogers, Bereskin & Parr

[57] ABSTRACT

Processes for the selective leaching of magnesium-containing solids, which contain calcium and/or heavy metals, and the selective precipitation and crystallization of the leached magnesium are provided. The leaching is conducted with aqueous sulphur dioxide at elevated temperatures with feed pulp densities which are sufficiently high to produce a leach liquor which is substantially saturated with magnesium. The selective crystallization and precipitation processes which preferably follow the selective leaching process, utilize controlled cooling, heating and pH conditions to yield a high purity magnesium sulphite product.

17 Claims, 1 Drawing Sheet

PROCESS FOR OBTAINING HIGH PURITY MAGNESIUM COMPOUNDS FROM MAGNESIUM CONTAINING MATERIALS

This application is a continuation of Application Ser. No. 07/067,516, filed Jun. 18, 1987, abandoned.

This invention relates to both the selective leaching and recovery of magnesium from magnesium-containing solids containing one or more of calcium and heavy metal compounds by treatment with aqueous sulphur dioxide solution. Magnesium sulphite products of the invention may be calcined to produce high purity magnesium oxide.

High purity magnesium oxide (magnesia) is used for a variety of purposes, including the manufacture of certain types of refractory brick, the production of certain chemicals and the production of magnesium metal. There is demand in the refractory industry for high purity magnesium oxide of the following composition:

| |
|---|
| $MgO \geq 98\%$ |
| $SiO < 0.2\%$ |
| $CaO < 0.6\%$ |
| $Fe_2O_3 + Mn_2O_3 + B_2O_3 < 0.2\%$ |

Conventionally, magnesium oxide is produced from sea water and brine wells and from magnesite ($MgCO_3$) deposits. However, the production of magnesium oxide from salt water is expensive and magnesite deposits are frequently not conveniently located and, depending on the nature of impurities, may require excessive treatment costs.

Deposits of minerals which contain substantial amounts of both magnesium carbonate and calcium carbonate, such as dolomite ($CaMg(CO_3)_2$) and brucitic dolomite ($Mg(OH)_2 \cdot CaMg(CO_3)_2$), are relatively common. While it is known that magnesium may be leached from magnesium-containing minerals using aqueous sulphur dioxide solution, it has not previously been reported to be possible to leach magnesium from dolomitic minerals, that is minerals containing substantial amounts of both magnesium and calcium carbonate, in aqueous sulphur dioxide solution without co-dissolving appreciable amounts of calcium and other impurities, such as iron and zinc, which may be present in deposits of such minerals. To our knowledge, the common deposits of dolomitic minerals have not been used as the sole source of high purity magnesium oxide in the commercial production of magnesium oxide.

U.S. Pat. No. 4,154,802 (Brandt et al), which issued May 15, 1979, discloses a process using aqueous sulphur dioxide solution to extract magnesium from magnesite at an elevated temperature, preferably between 55° and 65° C. This patent also discloses that co-dissolution of silica, often present with magnesite, may be reduced by increasing the slurry concentration or feed pulp density from 100 g/l to 200 g/l. However, this patent also teaches that the percentage co-dissolution of calcium under the preferred conditions is almost as extensive as the percentage dissolution of magnesium. In fact, the patent states that the magnesite feed material preferably contains less than 1% of calcium to yield a high purity magnesia product.

Techniques have been proposed for limiting the degree of co-dissolution of calcium in leaching magnesium from dolomitic minerals in aqueous sulphur dioxide solution. For example, U.S. Pat. No. 3,085,858 (Trubey et al), which issued April 16, 1963, teaches that co-dissolution of calcium may be reduced by the presence of carbon dioxide in the leach solution. Although an improvement in the MgO:CaO ratio of over eight times is reported, the resulting calcium co-dissolution can still be excessive over that desired to produce high purity magnesium oxide.

It has now been found, surprisingly, that substantially pure magnesium may be selectively leached from solids which contain substantial amounts of both magnesium carbonate and calcium carbonate by leaching in aqueous sulphur dioxide solution at an elevated temperature and using a feed pulp density sufficiently high and a retention time sufficiently long so as to produce a leach liquor substantially saturated in magnesium ions.

Impurities or contaminants including substantial amounts of calcium and/or heavy metals found in dolomite, brucitic dolomite, zinc bearing dolomite, and impure magnesite have been found not to be leached to any substantial extent in the selective leaching process of the present invention. By conducting the leaching process of this invention at very high feed pulp densities and at the temperature and pH conditions of this process, the leachate becomes substantially saturated with magnesium ions, thereby reducing the solubilities of the other species, including calcium, and heavy metals such as iron and zinc. While the feed pulp density needed to obtain a leachate saturated in magnesium will vary with the magnesium content of the feed material, for most of the magnesium-containing minerals listed above, the feed pulp density will typically be in the range of 200 to 400 g/l, and more preferably in the range of 225 to 400 g/l. The upper limit of feed pulp density is set only by the ability to physically handle a dense slurry. Retention times in the leaching step will typically be greater than 100 minutes and more preferably greater than 200 minutes.

By the term magnesium-containing solids, as used in this specification and in the claims, is meant a solid containing a substantial amount of one or more of magnesium carbonate, magnesium hydroxide and magnesium oxide. Without limiting same, magnesium-containing minerals include dolomite, brucitic dolomite, zinc bearing dolomite, brucitic calcite and magnesitic materials. The term magnesitic materials is meant to include minerals containing greater than 25% wt. magnesium carbonate. Calcium impurities in the above-mentioned solids will frequently constitute 5 to 25% wt. Heavy metals content may be in excess of about 0.2% but will usually be less than about 10%.

Thus, in accordance with a broad aspect of the process of the present invention, magnesium is extracted from a magnesium-containing solid which may also contain a substantial amount of one or more of calcium and heavy metals, by slurrying the mineral with aqueous sulphur dioxide at a temperature in excess of about 50° C. but below the boiling point, at a pH less than about 3.5, at a feed pulp density sufficiently high, and for a time sufficiently long so as to obtain a leach liquor substantially saturated in magnesium ions and to produce a magnesium depleted residue.

In accordance with another aspect of the invention, it has been found that high purity magnesium sulphite, which may be calcined to produce high purity magnesium oxide suitable for refractory or other uses, may be recovered from a leach liquor containing magnesium sulphite by selective crystallization and/or precipitation using a method of controlled cooling, heating and pH elevation.

Whether or not the leaching process is conducted in accordance with the conditions of leaching of this invention, the magnesium in a leach liquor obtained by leaching a magnesium-containing solid with aqueous sulphur dioxide can be recovered by the selective crystallization and/or precipitation process of this invention. In accordance with the selective crystallization process of this invention, the leach liquor which is preferably substantially saturated with magnesium ions is cooled to about ambient temperature or lower, typically to less than about 40° C. while maintaining the original pH of the leach liquor, to precipitate substantially pure magnesium sulphite crystals, which can be thereafter separated from the leach liquor. In accordance with the selective precipitation process of the invention which may be practiced in addition to the selective crystallization process, the pH of the leach liquor is increased to above 3.5 to precipitate calcium-containing compounds and heavy metals such as iron, which are then separated. The pH of the leach liquor may be increased by heating it to a temperature greater than about 60° C. or by adding an alkaline hydroxide such as magnesium hydroxide or calcium hydroxide or a carbonate, or both.

The leach liquor may be subsequently subjected to a second selective crystallization step. In this case, the temperature of the leach liquor may be increased to a temperature greater than about 60° C. The resulting mother liquor is cooled to ambient temperature to precipitate substantially pure magnesium sulphite crystals, which are separated.

The magnesium sulphite crystals obtained in accordance with this invention may be converted to high purity magnesium oxide by calcination, as is known in the art. However, the sulphur dioxide by-product produced during calcination may be advantageously recycled to the leaching steps of the invention.

The process of this invention will now be defined in accordance with its preferred embodiments with reference to the drawing which is a flow diagram of the preferred embodiment of the process.

The selective leaching process of this invention is preferably practised at a temperature in the range of about 65° C. to 75° C. and at a pH of about 3.0 or less. The pH of the leachate can be conveniently controlled with the addition of sulphur dioxide. As sulphur dioxide is consumed during the leaching step, additional sulphur dioxide is added to maintain the low pH. Leaching of the magnesium, to produce a leach liquor substantially saturated in magnesium ions is usually complete within about two to four hours, depending, of course, on the feedstock being treated and the conditions of leaching. The leach liquor containing high purity magnesium bisulphite and only minor amounts of calcium bisulphite and other impurities such as iron and zinc, is then separated from the magnesium depleted residue. Silica is expected to remain in the residue, and is thereby also removed from the magnesium.

The term substantially saturated, as used in this specification and in the claims, is meant to include a leach liquor containing at least 75% of the maximum amount of magnesium, as magnesium bisulphite, which will go into solution.

The feed pulp density in the leaching step, as previously stated will typically vary between about 200 and 400 g/l in order to produce a leach liquor substantially saturated in magnesium. For a relatively high content magnesium-containing mineral, such as a magnesitic material, a feed pulp density of about 210 g/l will suffice. However, with a feedstock having a lower content of magnesium such as brucitic dolomite, a higher feed pulp density of about 300 g/l is preferred.

The feedstock in the leaching process is preferably in a crushed or ground form to facilitate leaching. However, particle size has not been found to be a critical factor in the process, and particle sizes of 20 mesh can be accommodated in the process.

In the selective crystallization process of this invention the leach liquor, preferably substantially saturated with magnesium ions, is cooled while maintaining the original pH of the leach liquor. To maintain the pH, it may be necessary to add magnesium hydroxide and/or sparge with an inert gas, for example nitrogen, to drive off $SO_2$. A high purity sulphite thereupon crystallizes and/or precipitates and is removed from the leach liquor.

In accordance with the selective precipitation process of this invention, which is preferably practiced after the above selective crystallization process, the leach liquor is preferably heated to a temperature above 60° C. preferably to about 65° to 95° C. and more preferably to about 65° to 75° C. This increase in temperature may result in increasing the pH to above about 3.5, however, if additional alkaline material is needed to reach the desired pH, magnesium or calcium hydroxide may be added. Calcium and other impurities such as iron and zinc are thereupon precipitated out of solution and removed.

In accordance with the selective crystallization process of this invention, which is preferably practiced after the above selective precipitation process, the remaining leach liquor is then recooled to below about 30° C., while preferably maintaining the pH above about 3.5, by adding additional magnesium hydroxide or by sparging with an inert gas, or by both techniques, to yield a further crop of magnesium sulphite crystals or precipitate.

With reference to the drawing, in a preferred embodiment, the process includes two leaching steps, two crystallization steps and a selective precipitation step. Crushed or ground magnesium-containing solid is mixed with water to form a slurry and fed into a leaching vessel 10. Advantageously, the slurry is fed to the first leaching vessel 10 through a gas scrubber 12, the slurry being used to scrub the off-gases from the leaching step to recover $SO_2$. In the first leaching vessel 10, leaching is conducted at a temperature in the range of 65° to 75° C. with a feed pulp density of 200 to 400 g/l, preferably about 300 g/l. Sulphur dioxide gas is bubbled through the slurry to achieve and maintain a pH below 3.5. Under these conditions, leaching of about 80% of the magnesium may be achieved in about four hours while only about 1% of the calcium in the feedstock is dissolved when treating brucitic dolomite.

After leaching, the slurry is fed to a liquid-solid separator 14. The magnesium depleted residue is fed to a second leaching vessel 16 while the hot acidic leach liquor is forwarded to a crystallizer 18. The second leaching step is conducted in a similar manner to the first stage leaching to produce, after separation in a liquid-solid separator 20, a magnesium depleted residue which is passed through washer 22 prior to disposal, and a further leach liquor which is recycled to the first leaching vessel 10. The second leaching vessel 16 is used to extract recoverable magnesium remaining after the first leach step however magnesium saturation is not approached.

To recover magnesium sulphite as precipitate or crystals, the hot leach liquor is cooled in crystallizer 18 to approximately 25° C. while controlling the pH at approximately 3.5 or less by adding magnesium hydroxide. The resulting magnesium sulphite is removed in liquid-solid separator 24, and washed in washer 26.

The mother liquor from the crystallization step, containing additional magnesium as well as co-dissolved impurities, including calcium, iron and zinc, is fed to precipitator 28. The leach liquor is heated to about 65° to 95° C. while raising the pH to above 3.5. If the heating itself is insufficient to raise the pH, additional magnesium hydroxide is added to the precipitator 28. Co-dissolved impurities, including calcium, iron and zinc are thereupon precipitated. The solids are separated in liquid-solid separator 30, are washed in washer 32 and removed to disposal.

The mother liquor from separator 30 is subjected to a further crystallization step in crystallizer 34 by cooling to about 25° C. and maintaining the pH above about 3.5 by adding magnesium hydroxide. The magnesium sulphite precipitate or crystals which result are separated in liquid-solid separator 36 and then washed in washer 38. The remaining mother liquor is recycled to the second leaching vessel 16 so that magnesium remaining in solution may be recovered.

The combined yields of magnesium sulphite from washer 26 and 38 may be combined for subsequent calcining according to known techniques to produce magnesium oxide of above 98% purity which is about 94% densifiable without additives.

The process of the present invention and the preferred conditions thereof are further illustrated in the following examples.

EXAMPLE 1

This example is included to demonstrate, in succession, the selective leaching, crystallization and precipitation steps of this invention. A sample of brucitic dolomite (65-200 Mesh) with an analysis of 18% Mg, 11.7% Ca and 0.22% Fe, was slurried with water to achieve a feed pulp density of about 333 g/l. The slurry was heated at 67° C. and sulphur dioxide was bubbled through the mixture to reach and maintain a pH of between 3.1 and 3.4. After four hours of leaching, the leach liquor gave Mg:Ca and Mg:Fe ratios of 220:1 and 1360:1, respectively. The leach liquor was separated from the residue by filtration.

The leach liquor was cooled to 24° C. while the pH remained between about 3.0 and 3.4. Magnesium sulphite rich crystals were formed and were separated from the solution. No calcium or iron was detected in the crystals. The partially depleted mother liquor gave Mg:Ca and Mg:Fe ratios of 210:1 and 1370:1, respectively.

The mother liquor from the crystallization step was then re-heated to 65° C. while raising the pH to 3.5 with calcium hydroxide. After two hours at these conditions, the calcium-rich precipitate was separated from the solution. The precipitate gave Mg:Ca and Mg:Fe ratios of 1:48 and 10:1, respectively, while the resulting mother liquor gave Mg:Ca and Mg:Fe ratios of 280:1 and 2060:1, respectively.

The mother liquor from the above precipitation step was again cooled to 22° C. while the pH remained between 3.1 and 3.6. After two hours, a further crop of magnesium sulphite-rich crystals were separated from the solution. No calcium or iron was detected in the crystals. The resulting mother liquor gave Mg:Ca and Mg:Fe ratios of 200:1 and 1920:1, respectively. The mother liquor was held for additional 48 hours at 24° C. and a pH between 3.1 and 4.2 to yield further magnesium sulphite crystals having an analysis of Mg:Ca and Mg:Fe ratios of 1850:1 and 2770:1, respectively.

Approximately 70% of the magnesium in the feed mineral was extracted during the above leaching step, and approximately 58% of this leached magnesium was recovered as magnesium sulphite as a result of the crystallization and precipitation steps.

EXAMPLE 2

This example is included to demonstrate that a relatively impure leach liquor with respect to calcium and iron impurities can be treated in accordance with the selective crystallization and precipitation steps of this process to yield a high purity magnesium product.

A sample of magnesitic material was leached in an aqueous sulphur dioxide solution at 65° C. with a feed pulp density of approximately 275 g/l and a pH of approximately 3.0. The analysis of the feed material gave Mg:Ca and Mg:Fe ratios of 7.1:1 and 96:1, respectively. After leaching for four hours, the reported analysis of the resulting leach liquor gave Mg:Ca and Mg:Fe ratios of 140:1 and 120:1, respectively.

The leaching liquor was cooled to 25° and held for 36 hours at a pH of approximately 3.0 during which time magnesium sulphite-rich crystals were crystallized from the solution. The crystals were then separated from the solution. The reported analysis of the crystals gave Mg:Ca and Mg:Fe ratios of 4090:1 and 100:1, respectively. The analysis of the solution gave Mg:Ca and Mg:Fe ratios of 125:1 and 120:1, respectively.

The solution was then heated to 65° C. and the pH was raised to approximately 4.0 with additions of calcium hydroxide. The solution was held for two hours during which time a calcium-rich precipitate was formed. The analysis of the separated solution gave Mg:Ca and Mg:Fe of 170:1 and 1290:1, respectively. The solution is suitable for further magnesium sulphite recovery as performed in Example 1.

EXAMPLE 3

This example is included to demonstrate the selective precipitation and crystallization steps of the invention using a leach liquor containing magnesium and substantial amounts of calcium, iron and zinc impurities.

A sample of dolomitic zinc sulphide was leached in aqueous sulphur dioxide solution at 25° C. with a feed pulp density of approximately 350 g/l and pH of approximately 1.65. The analysis of the feed material was reported to be 9.6% Mg, 14.6% Ca, 0.20% Fe and 10.1% Zn. Thus, the Mg:Ca, Mg:Fe and Mg:Zn ratios of the feed material were 1:1.5, 49:1, and 1:1.1, respectively. After leaching for five hours and separating the solids, the reported analysis of the resulting leach liquor gave Mg:Ca, Mg:Fe and Mg:Zn ratios of 6.7:1, 126:1, and 222:1, respectively. Leaching at an elevated temperature in accordance with the selective leaching step of this invention would produce higher magnesium ratios but was not desired for this example, in order to demonstrate the efficiency of the selective precipitation and crystallization steps.

The leach liquor was heated to 75° C. and the pH was raised to 3.6 with additions of magnesium hydroxide. The solution was held for two hours and a precipitate was separated from the solution. The reported analysis of the resulting mother liquor gave Mg:Ca, Mg:Fe, and Mg:Zn ratios of 174:1, 151:1, and 824:1, respectively.

The solution was then cooled to 24° C. and held under a nitrogen atmosphere overnight at a pH between 3.6 and 3.8 during which time magnesium sulphite-rich crystals were crystallized from the solution. The reported analysis of the separated crystals gave Mg:Ca, Mg:Fe, and Mg:Zn ratios of 570:1, 107:1, and 570:1, respectively.

EXAMPLE 4

This example is included to demonstrate the selective crystallization step of this invention when practised with a hot aqueous $SO_2$ leach liquor which is substantially saturated with magnesium ions, but which contains calcium, iron and zinc impurities.

An aqueous sulphur dioxide solution at 50° C. having a pH of about 6.0 containing magnesium, calcium, iron and zinc was cooled to 24° C. in an open beaker over 48 hours. The magnesium sulphite crystals which formed were filtered from the solution to yield a mother liquor containing 10,000 ppm Mg, 160 ppm Ca, 17 ppm Fe and 11 ppm Zn.

The magnesium sulphite crystals which formed had an analysis of 142,000 ppm Mg, 14 ppm Ca, 83 ppm Fe and 19 ppm Zn. Comparing the analysis of the first mother liquor to the magnesium sulphite product gave the following ratios:

|  | Mg:Ca | Mg:Zn | Mg:Fe |
| --- | --- | --- | --- |
| First Mother Liquor | 62.5 | 909 | 588 |
| Magnesium Sulphite | 10,140 | 7,470 | 1,710 |
| Improvement | 162 | 8.2 | 2.9 |

While the present invention has been described in accordance with a number of illustrative embodiments and examples, it should be understood that it is not so limited, since many variations of the process will be apparent to persons skilled in the art without departing from the spirit and scope of the invention.

We claim:

1. A process for extracting magnesium from a solid containing magnesium in one or more of the forms of magnesium carbonate, magnesium hydroxide and magnesium oxide, said magnesium-containing solid also containing at least 5 weight percent of calcium impurities and optionally containing heavy metals, which process comprises:

slurrying the magnesium-containing solid with an aqueous treating agent consisting essentially of solubilized sulphur dioxide at a temperature of at least about 50° C. but below the boiling point, at a pH less than about 3.5, and at a feed pulp density of from about 200 to about 400 g/l to obtain a leach liquor substantially saturated in magnesium ions and to produce a magnesium depleted residue.

2. The process as claimed in claim 1, wherein the leaching time is at least 100 minutes.

3. The process as claimed in claim 1, wherein the leaching time is at least 200 minutes.

4. The process as claimed in claim 3, wherein the magnesium-containing solid is a mineral containing magnesium carbonate and calcium carbonate and is in a crushed or ground form.

5. The process as claimed in claim 4, wherein the temperature is in the range of about 65° to 75° C.

6. The process as claimed in claim 5, wherein the magnesium-containing solid is a magnesitic material and wherein the feed pulp density is at least about 210 g/l.

7. The process as claimed in claim 2, wherein the magnesium-containing solid is brucitic dolomite and wherein the feed pulp density is at least about 300 g/l.

8. The process as claimed in claim 1, which further comprises:

cooling the leach liquor separated from the residue to about ambient temperature or lower while maintaining the pH at a value less than about 3.5 to precipitate substantially pure magnesium sulphite and obtaining a first mother liquor depleted in magnesium.

9. The process as claimed in claim 8, wherein the magnesium-containing solid optionally contains iron and wherein the process further comprises:

heating the first mother liquor to a temperature of at least about 60° C. and increasing the pH of the liquor to about 3.5 or greater to precipitate calcium-containing and optionally iron-containing compounds, separating the calcium-containing and optionally iron-containing compounds and obtaining a second mother liquor.

10. The process as claimed in claim 9, which further comprises:

cooling the second mother liquor to about ambient temperature to precipitate substantially pure magnesium sulphite, separating the magnesium sulphite crystals and obtaining a third mother liquor.

11. The process as claimed in claim 9, wherein the first mother liquor is heated to a temperature of at least about 60° C. and the pH of the liquor is increased to about 4.0 or higher to precipitate calcium-containing and iron-containing compounds.

12. The process as claimed in claim 8 or 10, which further comprises:

calcining the separated magnesium sulphite to produce purified magnesium oxide.

13. A process for extracting magnesium from a solid containing magnesium in one or more of the forms of magnesium carbonate, magnesium hydroxide and magnesium oxide, which solid also contains at least 5 weight percent of calcium impurities and optionally contains heavy metals, which process comprises:

leaching the magnesium from the magnesium-containing solid with an aqueous treating agent consisting essentially of solubilized sulphur dioxide at a pH less than about 3.5, at a temperature of at least 50° C., and at a feed pulp density of from about 200 to about 400 g/l to produce a leach liquor substantially saturated with magnesium ions and a magnesium depleted residue and subsequently separating the leach liquor from the residue; and cooling the leach liquor to about ambient temperature while increasing the pH of the leach liquor, to precipitate substantially pure magnesium sulphite, and subsequently separating the magnesium sulphite.

14. The as claimed in claim 13, wherein the magnesium-containing solid contains calcium and heavy metals and wherein the magnesium sulphite formed is substantially free of calcium and heavy metals.

15. The process as claimed in claim 13, wherein the leaching step is conducted at a pH of less than about 3.0 and at a temperature of at least about 60° C.

16. The process as claimed in claim 14, wherein the magnesium-containing solid contains a substantial amount of one or both of iron and zinc.

17. The process as claimed in claim 1 or 13 wherein said solid is selected from the group consisting of dolomitic, magnesitic and brucitic dolomitic materials.

* * * * *